United States Patent
Tsuchihashi

(10) Patent No.: US 12,483,106 B2
(45) Date of Patent: Nov. 25, 2025

(54) ACTUATOR WITH MOVABLE BODY AND SUPPORT BODY HAVING MAGNETS AND YOKES WITH DIFFERENT THICKNESSES

(71) Applicant: NIDEC INSTRUMENTS CORPORATION, Nagano (JP)

(72) Inventor: Masao Tsuchihashi, Nagano (JP)

(73) Assignee: NIDEC INSTRUMENTS CORPORATION, Nagano (JP)

(*) Notice: Subject to any disclaimer, the term of this patent is extended or adjusted under 35 U.S.C. 154(b) by 210 days.

(21) Appl. No.: 18/454,040

(22) Filed: Aug. 22, 2023

(65) Prior Publication Data
US 2024/0072628 A1    Feb. 29, 2024

(30) Foreign Application Priority Data
Aug. 30, 2022 (JP) .................... 2022-136504

(51) Int. Cl.
*H02K 33/18*    (2006.01)
(52) U.S. Cl.
CPC .................... *H02K 33/18* (2013.01)
(58) Field of Classification Search
CPC ........ H02K 35/00; H02K 35/02; H02K 35/04; H02K 35/06; H02K 35/08; H02K 35/10; H02K 11/046; H02K 33/18; H02K 33/02; H02K 33/04; H02K 33/06; H02K 33/08; H02K 33/00; H02K 33/16; H02J 1/00; H02N 11/00; H02N 11/002; H02N 11/04
USPC .. 310/12, 12.12, 12.01, 12.03, 12.13, 12.16, 310/12.26, 25, 15–28
See application file for complete search history.

(56) References Cited

U.S. PATENT DOCUMENTS

| | | | | |
|---|---|---|---|---|
| 4,488,477 A * | 12/1984 | Miyamoto | ............ | F15B 15/086 92/255 |
| 5,973,422 A * | 10/1999 | Clamme | ................ | H02K 33/16 310/90.5 |
| 6,326,706 B1 * | 12/2001 | Zhang | ................... | F04B 35/045 310/12.32 |

(Continued)

FOREIGN PATENT DOCUMENTS

| EP | 3176930 | 6/2017 |
|---|---|---|
| JP | 2022083510 | 6/2022 |
| WO | 2022113819 | 6/2022 |

OTHER PUBLICATIONS

"Search Report of Europe Counterpart Application", issued on Jan. 22, 2024, p. 1-p. 9.

*Primary Examiner* — Maged M Almawri
(74) *Attorney, Agent, or Firm* — JCIPRNET

(57) ABSTRACT

An actuator includes a magnetic drive mechanism causing a movable body disposed inside a cylindrical case to vibrate. The movable body includes a support shaft, a magnet, a first yoke abutting against the magnet from one side in an axial direction, and a second yoke abutting against the magnet from an other side in the axial direction. A thickness in the axial direction of the magnet is smaller than that of the first yoke. A coil wound around a body portion of a coil holder is disposed on outer circumferential sides of the magnet and the first yoke. The second yoke includes an end plate portion abutting against the magnet from the other side in the axial direction, and a cylindrical portion extending from an outer edge of the end plate portion toward the one side in the axial direction and surrounding an outer circumferential side of the coil.

5 Claims, 7 Drawing Sheets

(56) References Cited

U.S. PATENT DOCUMENTS

| | | | | |
|---|---|---|---|---|
| 6,983,923 B2* | 1/2006 | Fukui | ............... | F16K 31/082 |
| | | | | 335/229 |
| 7,078,832 B2* | 7/2006 | Inagaki | ............... | H02K 7/14 |
| | | | | 335/238 |
| 7,288,085 B2* | 10/2007 | Olsen | ............... | A61M 5/14216 |
| | | | | 604/151 |
| 7,495,358 B2* | 2/2009 | Kobayashi | ......... | A61C 17/3445 |
| | | | | 310/15 |
| 7,791,456 B2* | 9/2010 | Miura | ............... | H02K 33/16 |
| | | | | 340/407.1 |
| 8,013,480 B2* | 9/2011 | Bang | ............... | B06B 1/045 |
| | | | | 310/12.33 |
| 8,097,991 B2* | 1/2012 | Masami | ............... | H02K 33/16 |
| | | | | 310/15 |
| 8,278,786 B2* | 10/2012 | Woo | ............... | H02K 33/16 |
| | | | | 310/15 |
| 8,288,899 B2* | 10/2012 | Park | ............... | H02K 33/16 |
| | | | | 310/71 |
| 8,575,794 B2* | 11/2013 | Lee | ............... | H02K 33/18 |
| | | | | 310/15 |
| 8,616,536 B2* | 12/2013 | Kim | ............... | F16F 7/1011 |
| | | | | 188/380 |
| 8,919,748 B2* | 12/2014 | Urayama | ............... | F16F 7/1011 |
| | | | | 267/140.14 |
| 9,461,530 B2* | 10/2016 | Wasenczuk | ............... | H02K 35/02 |
| 9,815,085 B2* | 11/2017 | Chun | ............... | G06F 3/016 |
| 10,151,370 B2* | 12/2018 | Kanaya | ............... | F16F 13/26 |
| 10,855,156 B2* | 12/2020 | Matsuyama | ............... | H02K 33/02 |
| 11,563,365 B2* | 1/2023 | Chiba | ............... | H02K 33/02 |
| 11,670,997 B2* | 6/2023 | Hirata | ............... | H02K 33/02 |
| | | | | 310/29 |
| 11,973,390 B2* | 4/2024 | Kim | ............... | H02K 41/031 |
| 2004/0119343 A1* | 6/2004 | Ueda | ............... | G10K 9/22 |
| | | | | 310/12.31 |
| 2006/0002577 A1* | 1/2006 | Won | ............... | B06B 1/045 |
| | | | | 381/396 |
| 2007/0085425 A1* | 4/2007 | Hirashima | ............... | H02K 33/16 |
| | | | | 310/15 |
| 2007/0182257 A1* | 8/2007 | Miura | ............... | H04R 9/02 |
| | | | | 310/23 |
| 2009/0320219 A1* | 12/2009 | Takahashi | ............... | H02K 33/16 |
| | | | | 15/21.1 |
| 2011/0018364 A1* | 1/2011 | Kim | ............... | H02K 33/18 |
| | | | | 310/20 |
| 2011/0018365 A1* | 1/2011 | Kim | ............... | B06B 1/045 |
| | | | | 310/20 |
| 2011/0062803 A1* | 3/2011 | Lee | ............... | H02K 33/18 |
| | | | | 310/29 |
| 2011/0068640 A1* | 3/2011 | Choi | ............... | H02K 5/04 |
| | | | | 310/25 |
| 2011/0089773 A1* | 4/2011 | Choi | ............... | H02K 33/16 |
| | | | | 310/25 |
| 2011/0133577 A1* | 6/2011 | Lee | ............... | H02K 33/18 |
| | | | | 310/15 |
| 2011/0193426 A1* | 8/2011 | Chung | ............... | H02K 33/16 |
| | | | | 310/25 |
| 2011/0193427 A1* | 8/2011 | Lemieux | ............... | F03G 7/08 |
| | | | | 310/25 |
| 2011/0198948 A1* | 8/2011 | Keisuke | ............... | H02K 5/225 |
| | | | | 310/25 |
| 2011/0198949 A1* | 8/2011 | Furuich | ............... | H02K 33/16 |
| | | | | 310/25 |
| 2011/0254385 A1* | 10/2011 | Makino | ............... | H02K 41/03 |
| | | | | 310/12.14 |
| 2011/0291497 A1* | 12/2011 | Choi | ............... | H02K 33/18 |
| | | | | 310/25 |
| 2012/0032535 A1* | 2/2012 | Park | ............... | H02K 35/02 |
| | | | | 310/25 |
| 2012/0293022 A1* | 11/2012 | Park | ............... | B06B 1/045 |
| | | | | 310/25 |
| 2013/0033128 A1* | 2/2013 | Yoon | ............... | H02K 33/18 |
| | | | | 310/25 |
| 2013/0033129 A1* | 2/2013 | Hong | ............... | B06B 1/045 |
| | | | | 310/25 |
| 2013/0043766 A1* | 2/2013 | Takahashi | ............... | H04R 17/00 |
| | | | | 310/326 |
| 2013/0099600 A1* | 4/2013 | Park | ............... | B06B 1/045 |
| | | | | 310/15 |
| 2013/0285479 A1* | 10/2013 | Kinoshita | ............... | H02K 35/02 |
| | | | | 310/12.12 |
| 2014/0062225 A1* | 3/2014 | Kim | ............... | H02K 33/00 |
| | | | | 310/15 |
| 2014/0103751 A1* | 4/2014 | Furukawa | ............... | H02K 35/02 |
| | | | | 310/25 |
| 2017/0328441 A1* | 11/2017 | Kanaya | ............... | F16F 13/26 |
| 2019/0267882 A1* | 8/2019 | Matsuyama | ............... | H02K 33/18 |
| 2019/0366383 A1* | 12/2019 | Yoshimura | ............... | F16F 1/328 |
| 2021/0159768 A1* | 5/2021 | Chiba | ............... | H02K 33/02 |
| 2022/0123642 A1* | 4/2022 | Takahashi | ............... | H02K 33/16 |
| 2023/0121657 A1* | 4/2023 | Tsuchihashi | ............... | H02K 5/225 |
| | | | | 310/15 |
| 2024/0006108 A1 | 1/2024 | Mori | | |

* cited by examiner

ACTUATOR WITH MOVABLE BODY AND SUPPORT BODY HAVING MAGNETS AND YOKES WITH DIFFERENT THICKNESSES

CROSS REFERENCE TO RELATED APPLICATION

The present invention claims priority under 35 U.S.C. § 119 to Japanese Application No. 2022-136504 filed Aug. 30, 2022, and the entire content of which is incorporated herein by reference.

TECHNICAL FIELD

At least an embodiment of the present invention relates to an actuator that causes a movable body to move relatively to a support body.

BACKGROUND

Japanese Patent Application Laid-Open No. 2022-083510 (JPA 2022-083510) describes an actuator including a connection body that is connected to a movable body and a support body, and a magnetic drive mechanism that causes the movable body to move to the support body. In the actuator of JPA 2022-083510, the support body includes a cylindrical case, lid members that close both ends of the case, and a coil holder disposed inside the case. The movable body includes a support shaft disposed at the center in the radial direction of the case, and a yoke and a magnet that are fixed to the support shaft. The magnetic drive mechanism includes a magnet and a coil wound around a coil holder disposed on an outer circumferential side of the magnet.

In JPA 2022-083510, the connection body includes an annular first connection body and an annular second connection body that are disposed at positions surrounding both ends of the support shaft. The first connection body and the second connection body each connect an outer frame member provided inside the case and an inner frame member fixed to an end portion of the support shaft. Thus, the movable body is supported inside the case so as to be movable in the axial direction. The first connection body and the second connection body are gel-like members such as silicone gel.

In the actuator that includes the magnetic drive mechanism, a vibration characteristic of the movable body is defined by thrust (magnetic drive power) that is generated in the magnetic drive mechanism including a coil, a magnet, and a yoke, weight of the movable body, and a spring constant of the gel-like member as the connection body.

In order to reduce the cost of the actuator, it has been proposed to reduce the dimension of the magnet because the component cost of the magnet is high. However, when the dimension of the magnet is reduced, the thrust of the magnetic drive mechanism is also decreased, and thus there is a concern that a target vibration characteristic may not be obtained.

SUMMARY

In consideration of the above problems, at least an embodiment of the present invention is to reduce the cost of the magnet and to suppress a decrease in the thrust of the magnetic drive mechanism.

In order to solve the above problems, an actuator according to at least an embodiment of the present invention includes a movable body that includes a support shaft, a support body that includes a case having a cylindrical shape and surrounding an outer circumferential side of the movable body, a connection body that is connected to the support body and the movable body, and a magnetic drive mechanism that includes a magnet disposed on the movable body and a coil disposed on the support body, and causes the movable body to move relative to the support body in an axial direction of the support shaft, in which the movable body includes a first yoke that abuts against the magnet from one side in the axial direction and a second yoke that abuts against the magnet from an other side in the axial direction, and the support shaft passes through the first yoke, the magnet, and the second yoke, the support body includes a coil holder disposed inside the case, the coil holder includes a body portion that surrounds outer circumferential sides of the first yoke and the magnet, and the coil is wound around the body portion, a thickness in the axial direction of the magnet is smaller than a thickness in the axial direction of the first yoke, and the second yoke includes an end plate portion that abuts against the magnet from the other side in the axial direction, and a cylindrical portion that extends from an outer edge of the end plate portion toward the one side in the axial direction and surrounds an outer circumferential side of the coil.

In at least an embodiment of the present invention, the movable body includes the first yoke that abuts against the magnet from the one side in the axial direction, and the second yoke that abuts against the magnet from the other side in the axial direction. The second yoke includes a cylindrical portion that extends toward the first yoke from an outer edge of an end plate portion abutting against the magnet, and is formed in a cup shape.

With such a configuration, the magnet can be supported from both sides in the axial direction by the first yoke and the second yoke. The magnet constitutes the magnetic drive mechanism that causes the movable body to move relatively in the axial direction, and is magnetized in two poles in the axial direction. Therefore, since a magnetic path can be formed at a position where the magnetic flux density is high by the first yoke and the second yoke, the magnetic efficiency is high. In addition, since the second yoke includes the end plate portion abutting against the magnet and the cylindrical portion extending from the outer edge of the end plate portion toward the first yoke, the magnetic flux directed from the first yoke to the cylindrical portion of the second yoke crosses the coil. Therefore, the magnetic efficiency is high. Further, since a thickness in the axial direction of the magnet is smaller than that of the first yoke, the volume of the magnet can be reduced, and the cost of the magnet can be reduced. The inventor of the present invention has found that, in reducing the volume of the magnet, compared to a case where the outer shape of the magnet as viewed from the axial direction is reduced and a case where the thickness of the magnet is reduced, the thrust (driving force) per unit volume of the magnet in the magnetic drive mechanism can be increased by reducing the thickness of the magnet. Therefore, according to at least an embodiment of the present invention, the actuator including the magnetic drive mechanism can reduce the cost of the magnet and suppress a decrease in the thrust of the magnetic drive mechanism.

In at least an embodiment of the present invention, it is preferable that, a protruding portion which protrudes toward the one side in the axial direction is further provided at a center of the end plate portion, and a distal end surface of the protruding portion abuts against the magnet. In this way, by partially increasing the thickness of the end plate portion by an amount corresponding to the reduction in thickness of the magnet, it is possible to avoid changes in the positional relationship of the magnet and the coil, and in the positional relationship of the members forming the magnetic path. Further, since the plate thickness of the cylindrical portion does not change, it is possible to avoid an increase in the radial dimension of the movable body. Alternatively, it is possible to avoid narrowing the radial width of the space in which the coil is disposed.

In at least an embodiment of the present invention, it is preferable that, the second yoke includes a first magnetic member that abuts against the magnet from the other side in the axial direction, and a second magnetic member that abuts against the first magnetic member from the other side in the axial direction, and the second magnetic member includes a disc portion that abuts against the first magnetic member from the other side in the axial direction and constitutes the end plate portion together with the first magnetic member, a bent portion that is provided on an outer edge of the disc portion, and the cylindrical portion that extends from the bent portion toward the one side in the axial direction. In this way, the thickness of the end plate portion can be partially increased by the thickness of the first magnetic member. Therefore, it is possible to avoid changes in the positional relationship of the magnet and the coil, and in the positional relationship of the members forming the magnetic path. Further, since the plate thickness of the cylindrical portion does not change, it is possible to avoid an increase in the radial dimension of the movable body. Alternatively, it is possible to avoid narrowing the radial width of the space in which the coil is disposed.

In at least an embodiment of the present invention, it is preferable that, the cylindrical portion extends to an outer circumferential side of the first yoke. In this way, the magnetic flux directed from the first yoke to the cylindrical portion of the second yoke crosses the coil. Therefore, the magnetic efficiency can be increased.

In at least an embodiment of the present invention, an outer shape of the first yoke as viewed from the axial direction is larger than that of the magnet. In this way, when an impact due to dropping or the like is applied, not the magnet but the first yoke collides with the body portion of the coil holder surrounding the outer circumferential sides of the first yoke and the magnet. Therefore, it is possible to prevent the magnet from colliding with another component when an impact is applied, and thus it is possible to suppress damage to the magnet and to increase impact resistance.

In at least an embodiment of the present invention, it is preferable that, the second yoke includes a weight adjustment member that abuts against the end plate portion from the other side in the axial direction, and the weight adjustment member includes a weight adjustment portion that is partially or entirely hollow in a thickness direction. In this way, the weight of the movable body can be changed without changing the thickness of the cylindrical portion. Therefore, it is possible to avoid an increase in the radial dimension of the movable body.

In at least an embodiment of the present invention, it is preferable that, the movable body includes a first inner frame member having a cylindrical shape that is fixed to an end portion on the one side in the axial direction of the support shaft, and a second inner frame member having a cylindrical shape that is fixed to an end portion on the other side in the axial direction of the support shaft. The support body includes a first outer frame member that is opposed to the first inner frame member on a radially outer side, and a second outer frame member that is opposed to the second inner frame member on the radially outer side. The connection body includes a first connection body having an annular shape that is disposed between the first inner frame member and the first outer frame member, and a second connection body having an annular shape that is disposed between the second inner frame member and the second outer frame member.

In this way, both ends of the movable body in the vibration direction are supported by the connection body. Therefore, the movable body is stably supported. In addition, since the connection body has an annular shape, the connection body is compressed when the movable body moves in a direction different from the vibration direction, and the spring constant is large. Therefore, the movable body can be prevented from tilting, and the collision between the movable body and the support body can be suppressed.

According to at least an embodiment of the present invention, the magnet can be supported from both sides in the axial direction by the first yoke and the second yoke. In addition, a magnetic path surrounding the magnet can be formed, and the magnetic flux directed from the first yoke to the cylindrical portion of the second yoke crosses the coil, so that the magnetic efficiency is high. Furthermore, since the thickness in the axial direction of the magnet is smaller than that of the first yoke, it is possible to reduce the cost of the magnet by reducing the volume of the magnet and to suppress a decrease in the thrust of the magnetic drive mechanism.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION (Overall Configuration)

Figure 1:
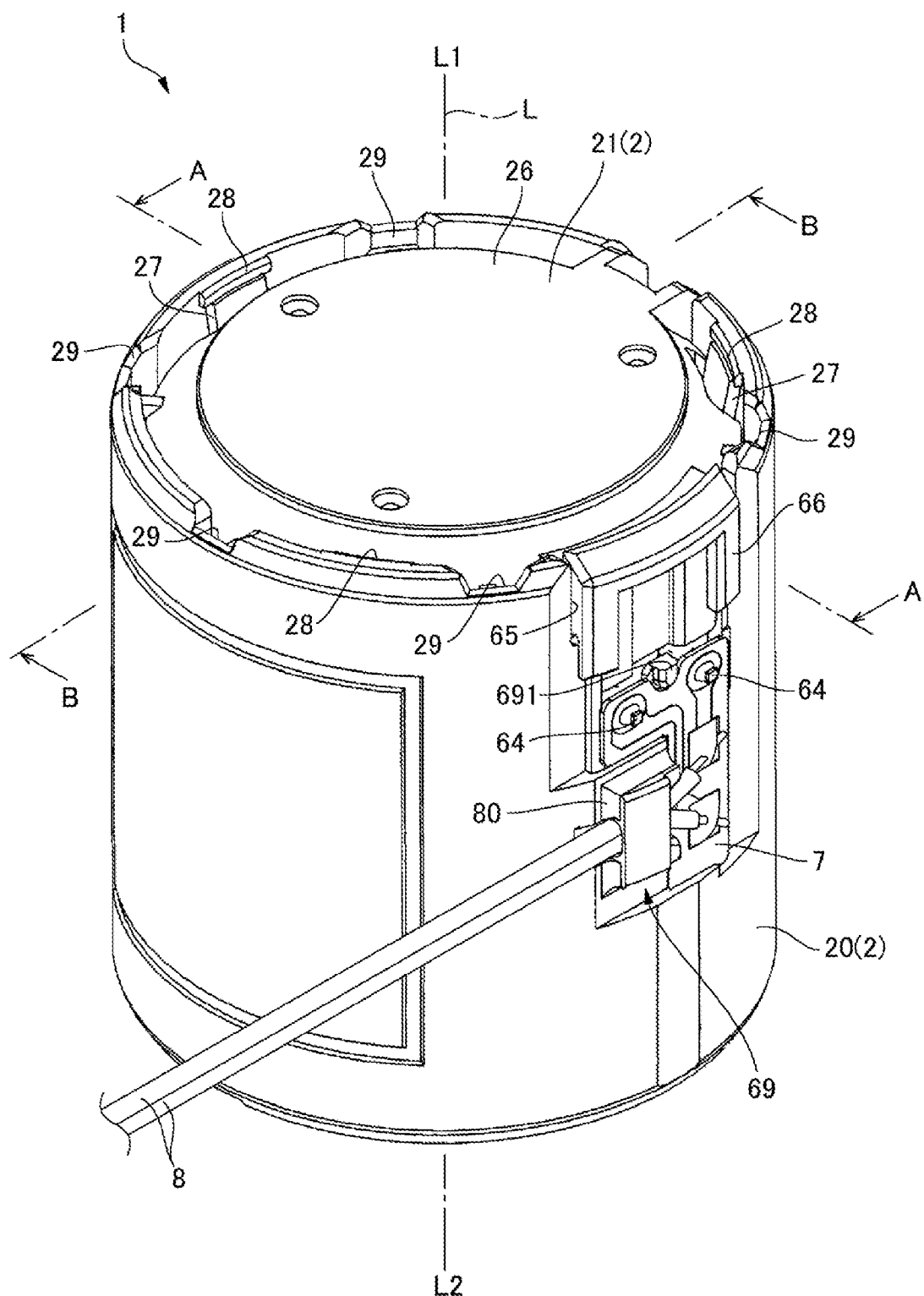
FIG. 1 is a perspective view of an actuator according to an embodiment of the present invention.
Figure 2:
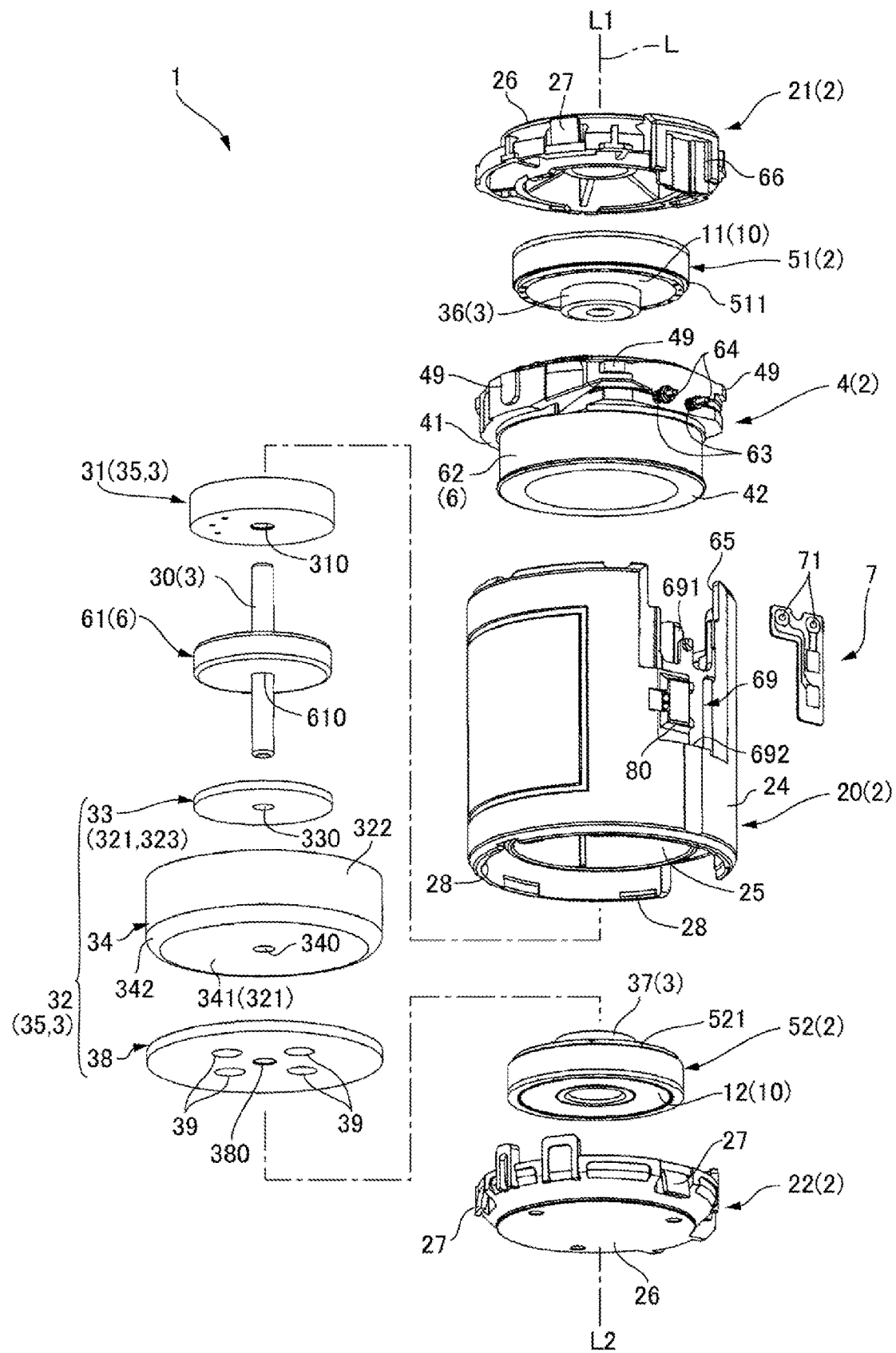
FIG. 2 is an exploded perspective view of the actuator illustrated in FIG. 1.
Figure 3:
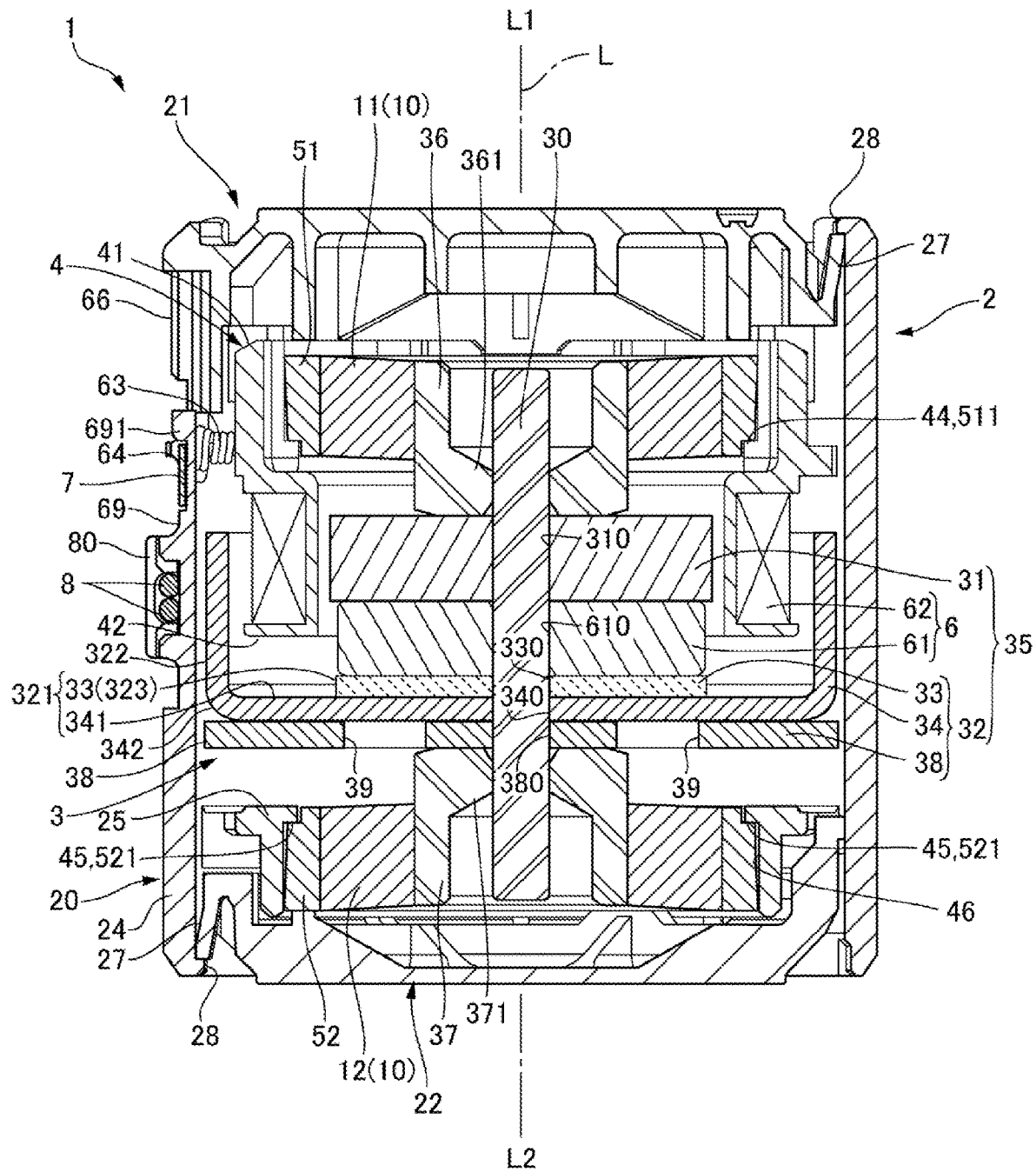
FIG. 3 is a cross-sectional view of the actuator illustrated in FIG. 1 (a cross-sectional view that is taken along A-A in FIG. 1)
Figure 4:
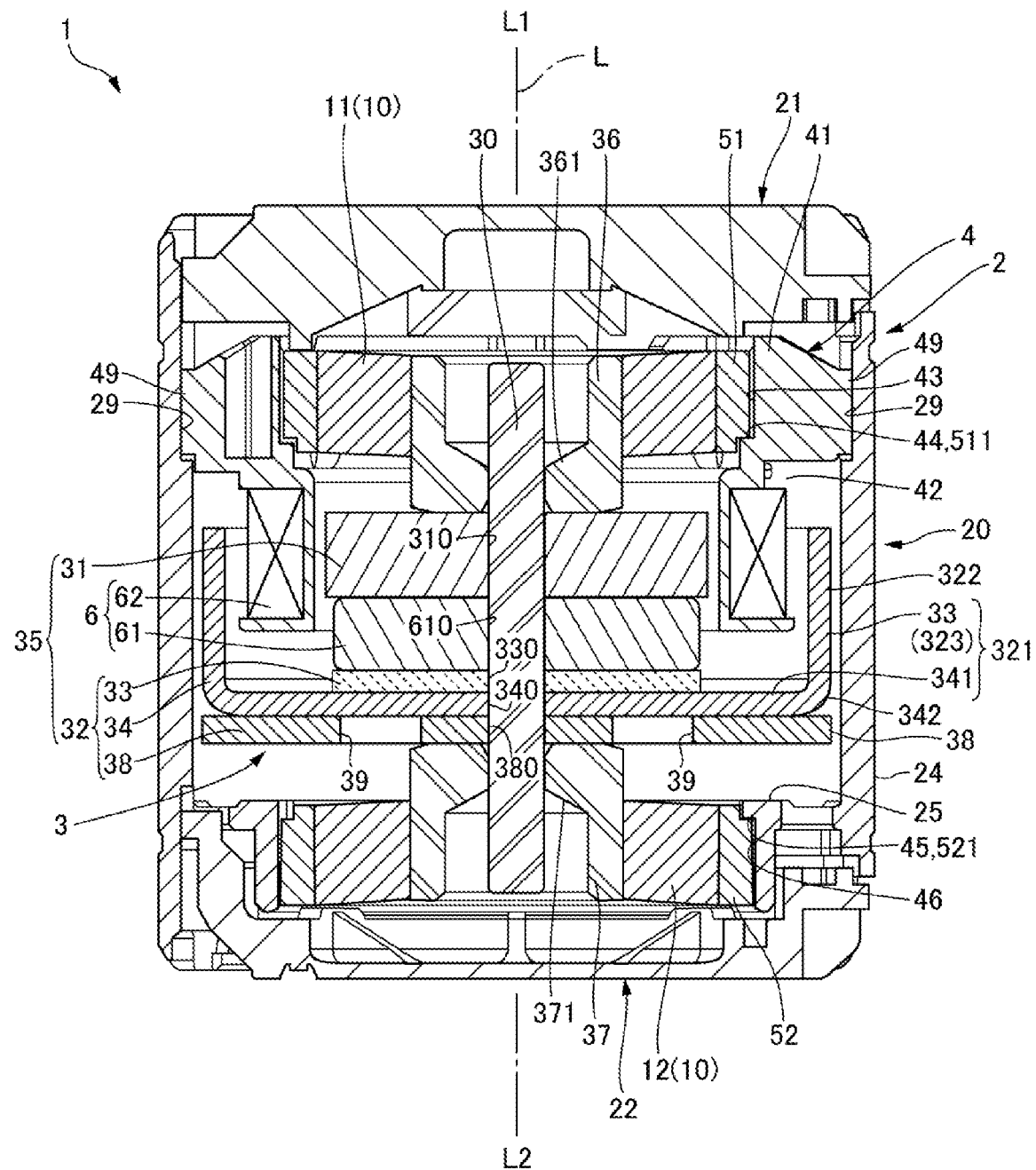
FIG. 4 is a cross-sectional view of the actuator illustrated in FIG. 1 (a cross-sectional view that is taken along B-B in FIG. 1)

Hereinafter, description is made on embodiments of the present invention with reference to the accompanying drawings. FIG. 1 is a perspective view of an actuator 1 according to an embodiment of the present invention. FIG. 2 is an exploded perspective view of the actuator 1 illustrated in FIG. 1. FIG. 3 and FIG. 4 are cross-sectional views of the actuator 1 illustrated in FIG. 1. FIG. 3 is a cross-sectional view that is taken along a position A-A in FIG. 1. FIG. 4 is a cross-sectional view that is taken along a position B-B in FIG. 1, and is a cross-sectional view that is taken in a direction orthogonal to FIG. 3. In the following description, a direction in which a center axis line L of a movable body 3 extends is set as an axial direction, one side of the axial direction is set as L1, and the other side of the axial direction is set as L2.

As illustrated in FIG. 1 to FIG. 4, the actuator 1 includes a support body 2, the movable body 3, a connection body 10 that is connected to the support body 2 and the movable body 3, and a magnetic drive mechanism 6 that causes the movable body 3 to move relative to the support body 2. The connection body 10 has at least one of elasticity or viscoelasticity. The magnetic drive mechanism 6 includes a magnet 61 disposed on the movable body 3 and a coil 62 disposed on the support body 2, and causes the movable body 3 to move relative to the support body 2 in the axial direction. As illustrated in FIGS. 3 and 4, at each position of an end portion on the one side L1 in the axial direction of the movable body 3 and an end portion on the other side L2 in the axial direction of the movable body 3, the movable body 3 is connected to the support body 2 via the connection body 10.

(Support Body)

As illustrated in FIG. 2 to FIG. 4, the support body 2 has a case 20 having a cylindrical shape, a first lid member 21 that closes an opening on the one side L1 in the axial direction of the case 20, a second lid member 22 that closes an opening on the other side L2 in the axial direction of the case 20, and a coil holder 4 disposed between the first lid member 21 and the second lid member 22 on an inner circumferential side of the case 20. In the present embodiment, the case 20, the first lid member 21, the second lid member 22, and the coil holder 4 are made of resin. The support body 2 also has a first outer frame member 51 that is fitted to an inner circumferential side of the coil holder 4, and a second outer frame member 52 that is fitted to the inner circumferential side of the case 20 at a position spaced apart from the first outer frame member 51 on the other side L2 in the axial direction.

(Connection Body)

The connection body 10 includes a first connection body 11 having an annular shape that is bonded to an inner circumferential surface of the first outer frame member 51, and a second connection body 12 having an annular shape that is bonded to an inner circumferential surface of the second outer frame member 52. In the present embodiment, as will be described below, the first connection body 11 and the second connection body 12 are gel-like members formed by molding a gel material, and are bonded to the first outer frame member 51 and the second outer frame member 52 respectively by viscosity of the gel-like members themselves.

(Coil Holder)

As illustrated in FIG. 2, the coil holder 4 includes a first outer frame member fixation portion 41 having an annular shape and a body portion 42 that protrudes to the other side L2 in the axial direction from the first outer frame member fixation portion 41. The coil 62 is disposed around the body portion 42. End portions of a coil wire 63 drawn from the coil 62 are wound around two terminal pins 64, each of which protrudes radially outward from the first outer frame member fixation portion 41 of the coil holder 4. As illustrated in FIG. 1, each of the terminal pins 64 protrudes to the outside of the case 20 and is connected to a wiring substrate 7.

The first outer frame member fixation portion 41 surrounds an outer circumferential side of the first outer frame member 51. As illustrated in FIG. 4, an inner circumferential surface of the first outer frame member fixation portion 41 is provided with a first concave portion 43 recessed to the other side L2 in the axial direction, and the first outer frame member 51 is press-fitted into the first concave portion 43. In the present embodiment, an annular step portion 511 formed on the outer circumferential surface of the first outer frame member 51 abuts in the axial direction against a first step portion 44 provided at an end portion on the other side L2 in the axial direction of the first concave portion 43.

(Case)

The case 20 includes a case body 24 having a cylindrical shape and a second outer frame member fixation portion 25 disposed on an inner circumferential side of the case body 24. The second outer frame member fixation portion 25 is disposed at a position spaced apart from the coil holder 4 on the other side L2 in the axial direction. As illustrated in FIGS. 2 and 4, the second outer frame member fixation portion 25 protrudes from an inner circumferential surface of the case body 24 to the inner circumferential side and is integrally molded with the case body 24.

An inner circumferential surface of the second outer frame member fixation portion 25 is provided with a second concave portion 46 recessed to the one side L1 in the axial direction, and the second outer frame member 52 is press-fitted into the second concave portion 46. In the present embodiment, an annular step portion 521 formed on the outer circumferential surface of the second outer frame member 52 abuts in the axial direction against a second step portion 45 provided at an end portion on the one side L1 in the axial direction of the second concave portion 46.

As illustrated in FIGS. 1 and 4, a plurality of groove portions 29 extending in the axial direction are formed in the inner circumferential surface of the case body 24 in which the coil holder 4 is fitted. As illustrated in FIG. 2, the coil holder 4 includes plural convex portions 49, each of which protrudes from an outer circumferential surface of the first outer frame member fixation portion 41. When the support body 2 is assembled, the respective convex portions 49 of the coil holder 4 are fitted into the respective groove portions 29 of the case body 24 from the one side L1 in the axial direction. As a result, the coil holder 4 is press-fitted and fixed to the case body 24.

(Lid Member)

As illustrated in FIGS. 3 and 4, the first lid member 21 is fixed to the case body 24 from the one side L1 in the axial direction of the first outer frame member fixation portion 41 provided in the coil holder 4. The second lid member 22 is fixed to the case body 24 from the other side L2 in the axial direction of the second outer frame member fixation portion 25. As illustrated in FIG. 2, each of the first lid member 21 and the second lid member 22 includes a lid portion 26 that has a circular shape as viewed from the axial direction and a plurality of locking portions 27 that are disposed at an outer circumferential edge of the lid portion 26 at equally-spaced intervals in a circumferential direction. In the present embodiment, each of the first lid member 21 and the second lid member 22 includes the locking portions 27 at three positions. The locking portion 27 is a claw portion that extends from the lid portion 26 so as to be inclined in a direction expanding to an outer circumferential side.

The locking portion 27 is elastically deformed in a radial direction, and is pushed into the inner circumferential side of the case body 24 together with the lid portion 26. The case 20 includes a restriction portion 28 that restricts the locking portion 27 from being unlocked from an inner side of the case 20. The restriction portion 28 is a convex portion that protrudes to the inner circumferential side from an end portion of the case body 24.

As illustrated in FIGS. 1 and 2, at each of the end portions on the one side L1 and the other side L2 of the case body 24 in the axial direction, the restriction portions 28 are disposed at three positions at equally-spaced intervals. The restriction portion 28 abuts against a distal end of the locking portion 27 in the axial direction. The first lid member 21 and the second lid member 22 are each fixed to the case 20 by using both fixation by an adhesive and a locking structure with the locking portion 27 and the restriction portion 28. Portions of the first outer frame member fixation portion 41 that overlap with the three restriction portions 28 provided on the case body 24 in the axial direction are cut out. Accordingly, when the coil holder 4 is inserted into the case body 24, interference between the first outer frame member fixation portion 41 and the restriction portion 28 is avoided.

(Wiring Substrate)

As illustrated in FIG. 2, the case 20 includes a cutout portion 65 formed by cutting out an edge of the case 20 on the one side L1 in the axial direction to the other side L2 in the axial direction, and a substrate fixation portion 69 formed on the other side L2 of the cutout portion 65. As illustrated in FIG. 1, the wiring substrate 7 is fixed to the substrate fixation portion 69 by using both fixation by an adhesive and a locking structure with a claw portion 691 and a locking groove 692. The claw portion 691 is provided at an end portion on the one side L1 in the axial direction of the substrate fixation portion 69, and the locking groove 692 is provided at an end portion on the other side L2 in the axial direction of the substrate fixation portion 69. A lead wire 8 for supplying power to the coil 62 is connected to the wiring substrate 7.

The substrate fixation portion 69 is provided with a lead wire holding portion 80 that holds the lead wire 8 at a position adjacent to the wiring substrate 7 in the circumferential direction.

The first outer frame member fixation portion 41 of the coil holder 4 is disposed on the inner circumferential side of the cutout portion 65. As illustrated in FIG. 2, the coil wire 63 drawn out from the coil 62 is wound around roots of the two terminal pins 64 protruding from the first outer frame member fixation portion 41. The two terminal pins 64 protrude to an outer circumferential side of the case 20 from a gap between a cover 66 extending from a part of the outer circumferential edge of the first lid member 21 in the circumferential direction to the other side L2 in the axial direction and the cutout portion 65 of the case 20, and are passed through two holes 71 (see FIG. 2) provided in the wiring substrate 7 to be electrically connected to lands provided at edges of the holes 71.

(Movable Body)

As illustrated in FIGS. 2, 3, and 4, the movable body 3 has a support shaft 30 that extends in the axial direction at a center in the radial direction of the support body 2. The magnet 61 and a yoke 35 are fixed to the support shaft 30 by a first inner frame member 36 having a cylindrical shape and a second inner frame member 37 having a cylindrical shape. The support shaft 30 is a round rod that is made of metal. Each of the first inner frame member 36 and the second inner frame member 37 is a cylindrical body that is made of metal, and is provided with a circular through hole.

On an inner circumferential surface of the first inner frame member 36, an annular protrusion portion 361 that protrudes radially inward is formed at an end portion on the other side L2 in the axial direction. Accordingly, when the first inner frame member 36 is press-fitted to the support shaft 30, the support shaft 30 is press-fitted into the annular protrusion portion 361. Meanwhile, on an inner circumferential surface of the second inner frame member 37, an annular protrusion portion 371 that protrudes radially inward is formed at an end portion on the one side L1 in the axial direction. Accordingly, when the second inner frame member 37 is press-fitted to the support shaft 30, the support shaft 30 is press-fitted into the annular protrusion portion 371.

The magnet 61 has a circular shape as viewed from the axial direction. A shaft hole 610 through which the support shaft 30 passes is provided at the center in the radial direction of the magnet 61, and the magnet 61 is fixed substantially at the center in the axial direction of the support shaft 30. The yoke 35 includes a first yoke 31 that abuts against the magnet 61 from the one side L1 in the axial direction and a second yoke 32 that abuts against the magnet 61 from the other side L2 in the axial direction.

A shaft hole 310 through which the support shaft 30 passes is provided in the center of the first yoke 31. The first yoke 31 is a magnetic plate whose outer diameter dimension is slightly larger than an outer diameter dimension of the magnet 61, and an outer circumferential surface of the first yoke 31 projects radially outward than an outer circumferential surface of the magnet 61. The first yoke 31 is fixed to an end surface on the one side L1 of the magnet 61 by a method such as adhesion.

The second yoke 32 includes an end plate portion 321 that abuts against the magnet 61 from the other side L2 in the axial direction, and a cylindrical portion 322 that extends from an outer edge of the end plate portion 321 toward the one side L1 in the axial direction. In the present embodiment, the second yoke 32 includes three magnetic members, that is, a disc-shaped first magnetic member 33, a cup-shaped second magnetic member 34, and a disc-shaped third magnetic member 38 (see FIG. 2). As illustrated in FIGS. 3 and 4, the plate thickness of the first magnetic member 33, the plate thickness of the second magnetic member 34, and the plate thickness of the third magnetic member 38 are all thinner than the plate thickness of the first yoke 31.

The first magnetic member 33 is provided with a shaft hole 330 through which the support shaft 30 passes, and is fixed to an end surface on the other side L2 of the magnet 61. The second magnetic member 34 includes a disc portion 341 provided with a shaft hole 340 through which the support shaft 30 passes, a bent portion 342 provided on an outer edge of the disc portion 341, and a cylindrical portion 322 extending from the bent portion 342 toward the one side L1 in the axial direction. That is, the cylindrical portion 322 of the second yoke 32 is constituted by the second magnetic member 34. The end plate portion 321 of the second yoke 32 is constituted by the disc portion 341 of the second magnetic member 34 and the first magnetic member 33. The disc portion 341 is provided with the shaft hole 340 through which the support shaft 30 passes.

The third magnetic member 38 is provided with a shaft hole 380 through which the support shaft 30 passes, and is fixed to the disc portion 341 of the second magnetic member 34 from the other side L2 in the axial direction. Among the plurality of magnetic members constituting the second yoke 32, the third magnetic member 38 functions as a weight adjustment member for adjusting the weight of the movable body 3. The third magnetic member 38 includes a weight adjustment portion 39. In the present embodiment, the weight adjustment portion 39 is a circular through hole. The number and a dimension of the weight adjustment portion 39 are set such that weight of the third magnetic member 38 matches a design value without changing an outer shape of the third magnetic member 38. In the present embodiment, as illustrated in FIG. 2, four weight adjustment portions 39 are arranged in the circumferential direction at angular intervals of 90 degrees. The four weight adjustment portions 39 are uniformly disposed in the circumferential direction with the center of gravity of the movable body 3 as a center.

When the movable body 3 is manufactured, the support shaft 30 is passed through the shaft holes 310, 610, 330, 340, and 380 of the respective members constituting the magnet 61 and the yoke 35. In this state, the first inner frame member 36 and the second inner frame member 37 are fixed to the support shaft 30 on both sides in the axial direction of the magnet 61 and the yoke 35. Thus, the first inner frame member 36 supports the magnet 61 and the yoke 35 from the one side L1 in the axial direction, and the second inner frame member 37 supports the magnet 61 and the yoke 35 from the other side L2 in the axial direction. Therefore, the magnet 61 and the yoke 35 are fixed to the support shaft 30.

An outer diameter dimension of the first magnetic member 33 is substantially the same as the outer diameter dimension of the magnet 61, and the first magnetic member 33 is smaller than the disc portion 341. Therefore, the first magnetic member 33 forms a protruding portion 323 that protrudes from the center in the radial direction of the end plate portion 321 toward the one side L1 in the axial direction, and the magnet 61 abuts against a distal end surface of the protruding portion 323. An inner diameter of the cylindrical portion 322 of the second yoke 32 is larger than the outer diameter of the magnet 61 and an outer diameter of the first yoke 31. Therefore, when the magnet 61 and the first yoke 31 are stacked on the first magnetic member 33 from the one side L1 in the axial direction, the cylindrical portion 322 is opposed to the outer circumferential surface of the magnet 61 and the outer circumferential surface of the first yoke 31 at a position spaced radially outward from the outer circumferential surface of the magnet 61 and the outer circumferential surface of the first yoke 31.

As illustrated in FIGS. 3 and 4, the body portion 42 of the coil holder 4 is inserted into a radial gap between the cylindrical portion 322 of the second yoke 32, and the first yoke 31 and the magnet 61. Therefore, the coil 62 wound around the body portion 42 is disposed between the cylindrical portion 322 and the outer circumferential surface of the magnet 61, and between the cylindrical portion 322 and the outer circumferential surface of the first yoke 31.

(Method of Manufacturing Connection Body)

Each of the first connection body 11 and the second connection body 12 is made of a viscoelastic body. For example, as each of the first connection body 11 and the second connection body 12, it is possible to employ the gel-like member made of silicone gel or the like, any of various rubber materials such as natural rubber, diene-based rubber (for example, styrene-butadiene rubber, isoprene rubber, butadiene rubber, chloroprene rubber, acrylonitrile butadiene rubber, and the like), non-diene-based rubber (for example, butyl rubber, ethylene-propylene rubber, ethylene-propylene-diene rubber, urethane rubber, silicone rubber, fluororubber, and the like), and thermoplastic elastomers, and a modified material of any of those. In addition, the viscoelastic body that can be used as the connection body 10 may be a composite member in which the gel-like member, the rubber, or the modified material thereof is combined with an elastic body such as a spring.

In the present embodiment, the first connection body 11 and the second connection body 12 are each made of a silicone gel having a penetration of 90 to 110. The first connection body 11 and the second connection body 12 are manufactured by a method of filling a mold with the gel material and curing the gel material (casting). When the first connection body 11 is molded, the first outer frame member 51 and the first inner frame member 36 are coaxially positioned by a jig, and an annular gap is formed between the first outer frame member 51 and the first inner frame member 36. Then, this gap is filled with the gel material, and the gel material is thermally cured. Thus, due to the viscosity of the gel-like member itself, the first connection body 11 is bonded to the inner circumferential surface of the first outer frame member 51 and the outer circumferential surface of the first inner frame member 36.

Prior to filling of the gap with the gel material, bonding strength can be increased by applying a bonding accelerator such as a primer to the inner circumferential surface of the first outer frame member 51 and the outer circumferential surface of the first inner frame member 36. Similarly, the second connection body 12 is molded by forming an annular gap between the second outer frame member 52 and the second inner frame member 37, filling this gap with the gel material, and thermally curing the gel material. Accordingly, when the actuator 1 is assembled, the support body 2 and the movable body 3 can be connected without a process of adhering the gel-like member.

(Operation of Actuator)

In the actuator 1, the magnetic drive mechanism 6 generates the drive power to drive the movable body 3 in the axial direction by energizing the coil 62. When the coil 62 is deenergized, the movable body 3 returns to an origin position by a return force of the connection body 10. Thus, by intermittently energizing the coil 62, the movable body 3 vibrates in the axial direction. In addition, by adjusting AC waveform that is applied to the coil 62, acceleration at which the movable body 3 moves to the one side L1 in the axial direction can be made to differ from the acceleration at which the movable body 3 moves to the other side L2 in the axial direction. Therefore, the user who holds a device, to which the actuator 1 is attached as a tactile device, can feel a sense of the vibration having directionality in the axial direction. The actuator 1 can also be used to constitute a speaker.

In the present embodiment, the connection body 10 is disposed at a position at which the support body 2 and the movable body 3 are opposed to each other in a first direction (the radial direction), and the movable body 3 vibrates in a second direction (the axial direction) that is orthogonal to the first direction (the radial direction). When the movable body 3 vibrates in the second direction (the axial direction) with respect to the support body 2, the first connection body 11 and the second connection body 12 are deformed in a shear direction by following the vibration of the movable body 3. The gel-like member, such as the silicone gel, has a linear or non-linear stretch characteristic depending on a stretching direction thereof. When the gel-like member is deformed in the shearing direction, a linear component thereof has a more significant deformation characteristic than a non-linear component thereof. Accordingly, when the movable body 3 vibrates in the axial direction with respect to the support body 2, the first connection body 11 and the second connection body 12 are deformed within a range of high linearity. Thus, it is possible to obtain a vibration characteristic with the favorable linearity.

When the movable body 3 moves in the radial direction, the first connection body 11 and the second connection body 12 are deformed in a collapsing direction. Here, a spring constant in a case where the gel-like member is deformed in the collapsing direction is about three times the spring constant in a case where the gel-like member is deformed in the shearing direction. As a result, it is possible to suppress the movable body 3 from moving in a direction different from the vibration direction (axial direction), and thus to suppress a collision between the movable body 3 and the support body 2.

(Main Effects of Present Embodiment)

As described above, the actuator 1 of the present embodiment includes the movable body 3 having the support shaft 30 extending in the axial direction, the support body 2 having the case 20 having a cylindrical shape and surrounding the outer circumferential side of the movable body 3, the connection body 10 that is connected to the support body 2 and the movable body 3, and the magnetic drive mechanism 6 that includes the magnet 61 disposed on the movable body 3 and the coil 62 disposed on the support body 2 and that causes the movable body 3 to move relative to the support body 2. The movable body 3 includes the first yoke 31 that abuts against the magnet 61 from the one side L1 in the axial direction, and the second yoke 32 that abuts against the magnet 61 from the other side L2 in the axial direction, and the support shaft 30 passes through the first yoke 31, the magnet 61, and the second yoke 32. The support body 2 includes the coil holder 4 disposed inside the case 20. The coil holder 4 includes the body portion 42 surrounding the outer circumferential sides of the first yoke 31 and the magnet 61, and the coil 62 is wound around the body portion 42. In the present embodiment, the thickness of the magnet 61 is thinner than that in the related art, and the thickness in the axial direction of the magnet 61 is smaller than the thickness of the first yoke 31 in the axial direction. The second yoke 32 includes the end plate portion 321 that abuts against the magnet 61 from the other side L2 in the axial direction, and the cylindrical portion 322 that extends from the outer edge of the end plate portion 321 toward the one side L1 in the axial direction and surrounds the outer circumferential side of the coil 62.

In the present embodiment, as described above, since the movable body 3 includes the first yoke 31 that abuts against the magnet 61 from the one side L1 in the axial direction and the second yoke 32 that abuts against the magnet 61 from the other side L2 in the axial direction, the magnet 61 can be supported from both sides in the axial direction by the first yoke 31 and the second yoke 32. The magnet 61 constitutes a magnetic drive mechanism 6 that causes the movable body 3 to move relatively in the axial direction, and is magnetized in two poles in the axial direction. Therefore, since a magnetic path can be formed at a position where the magnetic flux density is high by the first yoke 31 and the second yoke 32, the magnetic efficiency is high. In addition, since the second yoke 32 includes the end plate portion 321 abutting against the magnet 61 and the cylindrical portion 322 extending from the outer edge of the end plate portion 321 toward the first yoke 31 side, the magnetic flux from the first yoke 31 toward the cylindrical portion 322 of the second yoke 32 crosses the coil 62. Therefore, the magnetic efficiency is high. Furthermore, In the present embodiment, the thickness in the axial direction of the magnet 61 is smaller than that of the first yoke 31, and the volume of the magnet 61 is small. Therefore, the volume of the magnet 61 can be reduced, and thus the cost reduction of the magnet 61 can be achieved.

The inventor of the present invention has found that, in order to reduce the volume of the magnet 61 in the actuator 1 configured as in the present embodiment, there are a case where the outer shape of the magnet 61 viewed from the axial direction is reduced (i.e., the diameter of the magnet 61 is reduced) and a case where the thickness of the magnet 61 is reduced, and the thrust (driving force) per unit volume of the magnet 61 in the magnetic drive mechanism 6 can be increased in the case where the thickness of the magnet 61 is reduced. More specifically, the present inventor has experimentally confirmed that when the volume of the magnet 61 is reduced by reducing the diameter of the magnet 61, the rate of decrease in volume and the rate of decrease in acceleration of the actuator 1 are substantially equal to each other, but when the volume of the magnet 61 is reduced by reducing the thickness of the magnet 61, the rate of decrease in acceleration is only about half of the rate of decrease in volume. Therefore, according to the configuration of the present embodiment, it is possible to reduce the cost of the magnet 61 and to suppress a decrease in the thrust of the magnetic drive mechanism 6.

In the present embodiment, at the center of the end plate portion 321 of the second yoke 32, a protruding portion 323 protruding toward the on the one side L1 in the axial direction is provided, and a distal end surface of the protruding portion 323 abuts against the magnet 61. In this way, by partially increasing the thickness of the end plate portion 321 by an amount corresponding to the reduction in thickness of the magnet 61, it is possible to avoid changes in the positional relationship of the magnet 61 and the coil 62, and in the positional relationship of the members (the first yoke 31 and the second yoke 32) forming the magnetic path. In addition, since the plate thickness of the cylindrical portion 322 does not change, it is possible to avoid an increase in the radial dimension of the movable body 3. Alternatively, it is possible to avoid narrowing the radial width of the space in which the coil 62 is disposed. In addition, since the gap in the axial direction between the body portion 42 of the coil holder 4 and the disc portion 341 of the second magnetic member 34 is not narrowed, it is possible to secure a space for the movable body 3 to vibrate in the axial direction.

In the present embodiment, the second yoke 32 includes the first magnetic member 33 that abuts against the magnet 61 from the other side L2 in the axial direction, and the second magnetic member 34 that abuts against the first magnetic member 33 from the other side L2 in the axial direction. The second magnetic member 34 includes a disc portion 341 that abuts against the first magnetic member 33 from the other side L2 in the axial direction, a bent portion 342 provided at the outer edge of the disc portion 341, and a cylindrical portion 322 that extends from the bent portion 342 toward the one side L1 in the axial direction (i.e., toward the side of the magnet 61). The disc portion 341 constitutes the end plate portion 321 of the second yoke 32 together with the first magnetic member 33. As described above, In the present embodiment, since the thickness of the end plate portion 321 is partially increased by fixing the first magnetic member 33, the thickness in the axial direction of the magnet 61 can be decreased to reduce the cost without changing the arrangement of the magnet 61 and the coil 62 and the arrangement of the members forming the magnetic path. In addition, since the plate thickness of the cylindrical portion 322 does not change, it is possible to avoid an increase in the radial dimension of the movable body 3. Alternatively, it is possible to avoid narrowing the radial width of the space in which the coil 62 is disposed. Further, since the gap in the axial direction between the body portion 42 of the coil holder 4 and the disc portion 341 of the second magnetic member 34 is not narrowed, it is possible to secure a space for the movable body 3 to vibrate in the axial direction.

In the present embodiment, since the cylindrical portion 322 of the second yoke 32 extends to the outer circumferential side of the first yoke 31, the magnetic flux directed from the first yoke 31 to the cylindrical portion 322 crosses the coil 62. Therefore, the magnetic efficiency is high.

In the present embodiment, the outer shape of the first yoke 31 as viewed from the axial direction is larger than that of the magnet 61. In a case where the first yoke 31 is larger than the magnet 61, when an impact due to dropping or the like is applied, not the magnet 61 but the first yoke 31 collides with the body portion 42 of the coil holder 4 surrounding the outer circumferential sides of the first yoke 31 and the magnet 61. Therefore, it is possible to prevent the magnet 61 from colliding with another component when an impact is applied, and thus it is possible to suppress damage to the magnet 61. Therefore, the impact resistance is high.

In the present embodiment, the second yoke 32 includes the third magnetic member 38 that abuts against the end plate portion 321 from the other side L2 in the axial direction, and the third magnetic member 38 functions as a weight adjustment member for adjusting the weight of the movable body 3. Therefore, the third magnetic member 38 (weight adjustment member) includes the weight adjustment portion 39 that is partially or entirely hollow in the thickness direction. In this way, by fixing the weight adjustment member as a separate member to the end plate portion 321, the weight of the movable body 3 can be changed without changing the thickness of the cylindrical portion 322. Accordingly, it is possible to avoid an increase in the radial dimension of the movable body 3.

In the present embodiment, since the third magnetic member 38 includes the through hole as the weight adjustment portion 39, the weight of the third magnetic member 38 can be changed without changing the outer shape thereof.

The magnetic flux density of the second yoke 32 is highest at a position overlapping the outer circumferential edge of the magnet 61 as viewed from the axial direction. In the present embodiment, the weight adjustment portion 39 is disposed on the inner circumferential side more than the outer circumferential edge of the magnet 61 as viewed from the axial direction, and is provided at a position shifted from the position where the magnetic flux density is the highest. The weight adjustment portion 39 is a portion where the magnetic member is lost. Therefore, by shifting the position of the weight adjustment portion 39 from the position overlapping the outer circumferential edge of the magnet 61 as viewed from the axial direction, an increase in magnetic resistance can be suppressed, and a decrease in magnetic efficiency can be suppressed.

In the second yoke 32, the cup-shaped second magnetic member 34 is manufactured by drawing, and the magnetic flux density of the bent portion 342 connecting the disc portion 341 and the cylindrical portion 322 is high. In the present embodiment, the outer diameter of the third magnetic member 38 and the outer diameter of the cylindrical portion 322 have the same dimension. Therefore, in the second yoke 32, the thickness of a portion having a high magnetic flux density is secured by the outer circumferential end portion of the third magnetic member 38. Accordingly, an increase in magnetic resistance can be suppressed, and a decrease in magnetic efficiency can be suppressed.

The weight adjustment portion 39 may not be a through hole, but may be a half-blanked portion. In other words, as long as the weight adjustment portion 39 is a portion that is partially or entirely hollow in the thickness direction, the weight adjustment portion 39 does not have to be the through hole that is entirely hollow in the thickness direction, and may be the half-blanked portion that is partially hollow in the thickness direction.

In the present embodiment, since the weight adjustment portions 39 are uniformly disposed in the circumferential direction with the center of gravity of the movable body 3 as a center, it is possible to prevent the center of gravity of the movable body 3 from being shifted caused by providing the weight adjustment portions 39.

In the present embodiment, the second yoke 32 is constituted by three magnetic members, and the first magnetic member 33, the disc portion 341 of the second magnetic member 34, and the third magnetic member 38 are stacked and fixed to the end surface of the magnet 61. As a result, it is possible to increase the thickness of the portion of the second yoke 32 having a high magnetic flux density, while preventing the plate thickness of the cylindrical portion 322 surrounding the outer circumferential side of the magnet 61 from being increased more than necessary. Therefore, it is possible to improve magnetic efficiency, to suppress an increase in an outer diameter of the movable body 3, and thus to suppress enlargement of the actuator 1.

In the present embodiment, the movable body 3 includes the first inner frame member 36 having a cylindrical shape and fixed to an end portion on the one side L1 in the axial direction of the support shaft 30, and a second inner frame member 37 having a cylindrical shape and fixed to an end portion on the other side L2 in the axial direction of the support shaft 30. The support body 2 includes the first outer frame member 51 opposed to the first inner frame member 36 on the radially outer side, and the second outer frame member 52 opposed to the second inner frame member 37 on the radially outer side. The connection body 10 includes the first connection body 11 having an annular shape disposed between the first inner frame member 36 and the first outer frame member 51, and the second connection body 12 having an annular shape disposed between the second inner frame member 37 and the second outer frame member 52. Therefore, since both ends of the movable body 3 in the vibration direction are supported by the connection body 10, the movable body 3 can be stably supported. In addition, since the connection body 10 has an annular shape, when the movable body 3 moves in a direction different from the vibration direction, the connection body 10 is compressed, and the spring constant is large. Therefore, the movable body 3 can be prevented from tilting, and the collision between the movable body 3 and the support body 2 can be suppressed.

(Modification Examples)

Figure 5:
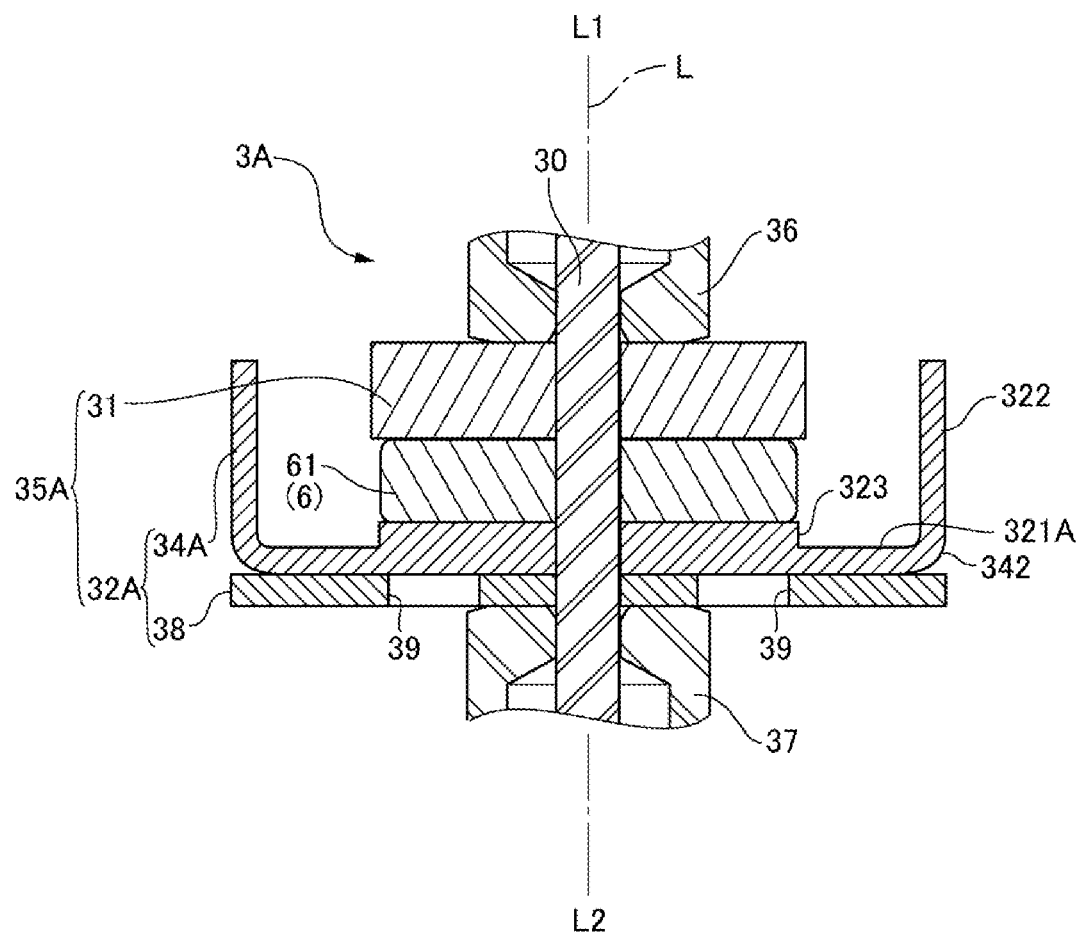
FIG. 5 is a cross-sectional view of a movable body of Modification Example 1.
Figure 6:
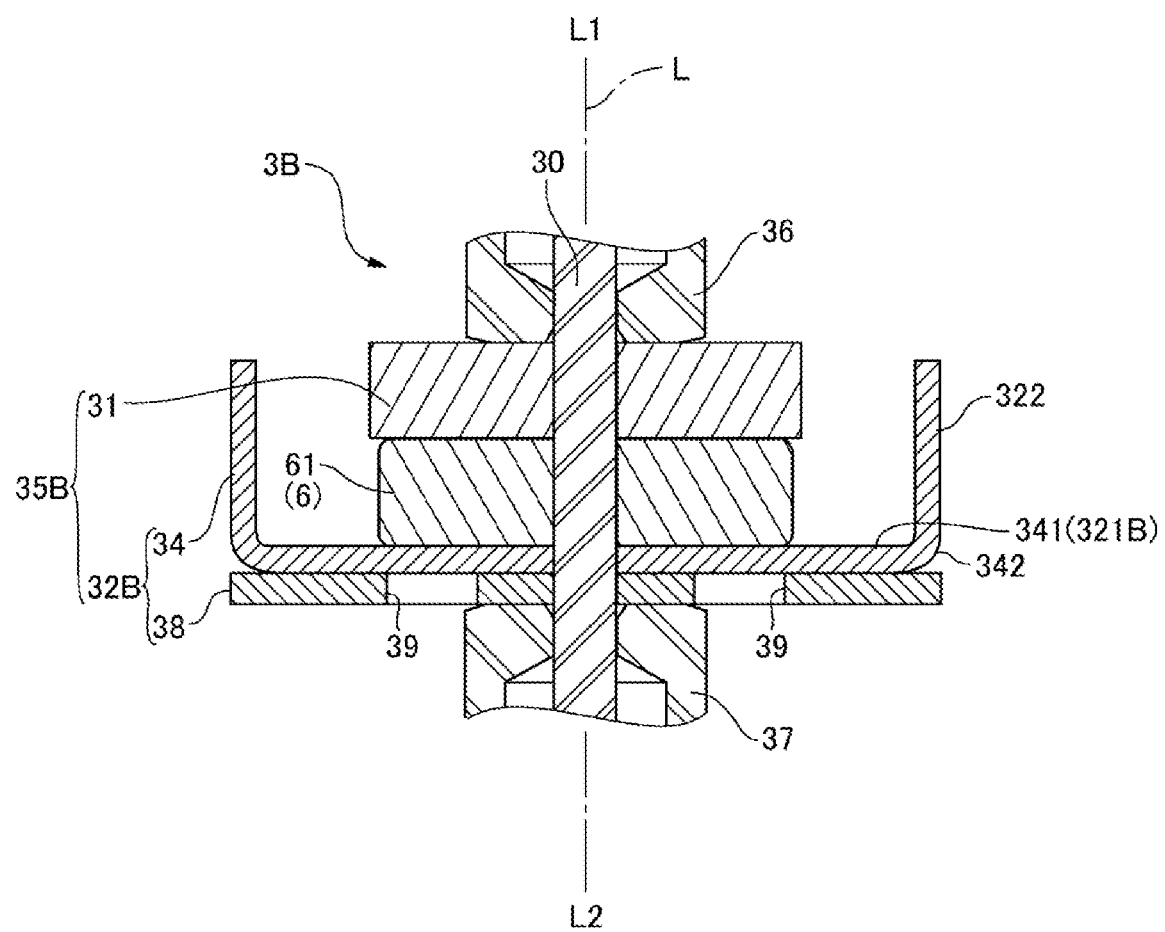
FIG. 6 is a cross-sectional view of a movable body of Modification Example 2.
Figure 7:
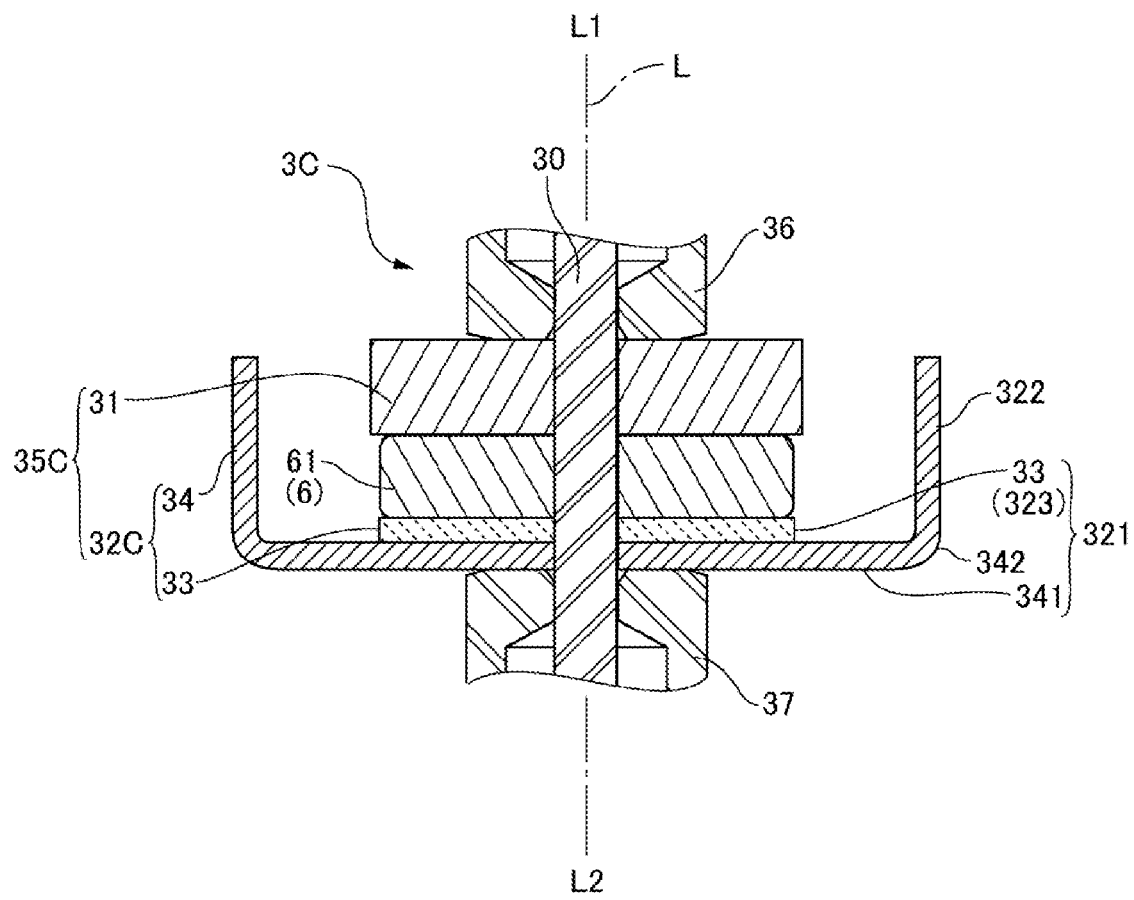
FIG. 7 is a cross-sectional view of a movable body of Modification Example 3.

In the above-described embodiment, the second yoke 32 is constituted by three magnetic members, but the configuration of the second yoke 32 may be different from the above-described embodiment. FIG. 5 is a cross-sectional view of a movable body 3A of Modification Example 1. FIG. 6 is a cross-sectional view of a movable body 3B of Modification Example 2. FIG. 7 is a cross-sectional view of a movable body 3C of Modification Example 3. Hereinafter, the same components as those of the above-described embodiment are denoted by the same reference numerals, and a description thereof will be omitted, and different components are denoted by different reference numerals.

As illustrated in FIG. 5, the movable body 3A of Modification Example 1 includes the magnet 61, the first yoke 31 which abuts against the magnet 61 from the one side L1 in the axial direction, and a second yoke 32A which abuts against the magnet 61 from the other side L2 in the axial direction. The second yoke 32A includes a second magnetic member 34A and the third magnetic member 38. The second magnetic member 34A is a magnetic member having a shape in which the first magnetic member 33 and the second magnetic member 34 of the above-described embodiment are integrated. Therefore, the second magnetic member 34A includes an end plate portion 321A, the bent portion 342, and the cylindrical portion 322, and the end plate portion 321A includes the protruding portion 323 that protrudes from the center in the radial direction toward the one side L1 in the axial direction. The protruding portion 323 has the same shape as the first magnetic member 33 of the above-described embodiment.

In Modification Example 1, instead of using the first magnetic member 33, the plate thickness of the second magnetic member 34A is partially increased. Thus, as in the above-described embodiment, the volume of the magnet 61 can be reduced to reduce the cost without changing the arrangement of the magnet 61 and the coil 62, and the arrangement of the members forming the magnetic path. In this case, since the volume of the magnet 61 is reduced by reducing the thickness of the magnet 61, it is possible to reduce the cost of the magnet 61 and to suppress a decrease in the thrust of the magnetic drive mechanism 6. In addition, since the gap in the axial direction between the body portion 42 of the coil holder 4 and the second magnetic member 34 is not narrowed, it is possible to secure a space for the movable body 3 to vibrate in the axial direction.

As illustrated in FIG. 6, the movable body 3B of Modification Example 2 includes the magnet 61, the first yoke 31 that abuts against the magnet 61 from the one side L1 in the axial direction, and a second yoke 32B that abuts against the magnet 61 from the other side L2 in the axial direction. The second yoke 32B is constituted by two components of the second magnetic member 34 and the third magnetic member 38, which have the same shapes as those of the above-described embodiment, and is not provided with the first magnetic member 33. Therefore, an end plate portion 321B of the second yoke 32B is constituted by only the disc portion 341 of the second magnetic member 34. The disc portion 341 (end plate portion 321B) abuts against the magnet 61 from the other side L2 in the axial direction.

In the movable body 3B of Modification Example 2, since the first magnetic member 33 is omitted, the positions of the second magnetic member 34 and the third magnetic member 38 in the axial direction are shifted to the one side L1 in the axial direction by an amount corresponding to the reduction in the plate thickness of the magnet 61. Therefore, an amplitude of vibration of the movable body 3 and an arrangement of the coil holder 4 are set such that a gap in the axial direction larger than the amplitude of vibration of the movable body 3 is secured between the body portion 42 of the coil holder 4 and the disc portion 341 (end plate portion 321B) of the second magnetic member 34. In Modification Example 2, as in the above-described embodiment, since the volume of the magnet 61 is reduced by reducing the thickness of the magnet 61, it is possible to reduce the cost of the magnet 61 and to suppress a decrease in the thrust of the magnetic drive mechanism 6.

As illustrated in FIG. 7, the movable body 3C of Modification Example 3 includes magnet 61, the first yoke 31 that abuts against the magnet 61 from the one side L1 in the axial direction, and a second yoke 32C that abuts against the magnet 61 from the other side L2 in the axial direction. The second yoke 32C is constituted by two components of the first magnetic member 33 and the second magnetic member 34, which have the same shapes as those of the above-described embodiment, and is not provided with the third magnetic member 38. In the second yoke 32C, the first magnetic member 33 abuts against the magnet 61 from the other side L2 in the axial direction, and the disc portion 341 of the second magnetic member 34 abuts against the first magnetic member 33 from the other side L2 in the axial direction. The end plate portion 321 of the second yoke 32 is constituted by the disc portion 341 and the first magnetic member 33.

Although the movable body 3C of Modification Example 3 is not provided with the third magnetic member 38 which functions as a weight adjustment member, since the shapes and the arrangements of the first magnetic member 33 and the second magnetic member 34 are the same as those of the above-described embodiment, the volume of the magnet 61 can be reduced by reducing the thickness of the magnet 61 in the same manner as in the above-described embodiment. Therefore, it is possible to reduce the cost of the magnet 61 and to suppress a decrease in the thrust of the magnetic drive mechanism 6.

What is claimed is:

1. An actuator, comprising:
    a movable body that comprises a support shaft;
    a support body that comprises a case having a cylindrical shape and surrounding an outer circumferential side of the movable body;
    a connection body that is connected to the support body and the movable body; and
    a magnetic drive mechanism that comprises a magnet disposed on the movable body and a coil disposed on the support body, and causes the movable body to move relative to the support body in an axial direction of the support shaft, wherein
    the movable body comprises a first yoke that abuts against the magnet from one side in the axial direction and a second yoke that abuts against the magnet from an other side in the axial direction, and the support shaft passes through the first yoke, the magnet, and the second yoke,
    the support body comprises a coil holder disposed inside the case,
    the coil holder comprises a body portion that surrounds outer circumferential sides of the first yoke and the magnet, and the coil is wound around the body portion,
    a thickness in the axial direction of the magnet is smaller than a thickness in the axial direction of the first yoke, and
    the second yoke comprises an end plate portion that abuts against the magnet from the other side in the axial direction, and a cylindrical portion that extends from an outer edge of the end plate portion toward the one side in the axial direction and surrounds an outer circumferential side of the coil,
    wherein the second yoke comprises:
        a first magnetic member that abuts against the magnet from the other side in the axial direction;
        a second magnetic member that abuts against the first magnetic member from the other side in the axial direction; and
        a weight adjustment member that abuts against the end plate portion from the other side in the axial direction,
    wherein the second magnetic member comprises:
        a disc portion that abuts against the first magnetic member from the other side in the axial direction and constitutes the end plate portion together with the first magnetic member,
        a bent portion that is provided on an outer edge of the disc portion, and
        the cylindrical portion that extends from the bent portion toward the one side in the axial direction, wherein the weight adjustment member comprises a plurality of weight adjustment portions that is partially or entirely hollow in a thickness direction, and the plurality of weight adjustment portions is uniformly disposed in a circumferential direction with a center of gravity of the movable body as a center.

2. The actuator according to claim 1, further comprising:

a protruding portion, being provided at a center of the end plate portion, wherein the protruding portion protrudes toward the one side in the axial direction, and a distal end surface of the protruding portion abuts against the magnet.

3. The actuator according to claim 1, wherein the cylindrical portion extends to an outer circumferential side of the first yoke.

4. The actuator according to claim 1, wherein an outer shape of the first yoke as viewed from the axial direction is larger than that of the magnet.

5. The actuator according to claim 1, wherein the movable body comprises:

a first inner frame member having a cylindrical shape that is fixed to an end portion on the one side in the axial direction of the support shaft, and a second inner frame member having a cylindrical shape that is fixed to an end portion on the other side in the axial direction of the support shaft, the support body comprises:

a first outer frame member that is opposed to the first inner frame member on a radially outer side, and a second outer frame member that is opposed to the second inner frame member on the radially outer side, the connection body comprises:

an first connection body having an annular shape that is disposed between the first inner frame member and the first outer frame member, and an second connection body having an annular shape that is disposed between the second inner frame member and the second outer frame member.

* * * * *